(12) United States Patent
Moser et al.

(10) Patent No.: US 8,128,721 B2
(45) Date of Patent: Mar. 6, 2012

(54) INTAKE FILTER FOR AN INTERNAL COMBUSTION ENGINE OF A MOTOR VEHICLE

(75) Inventors: Nikolaus Moser, Ditzingen (DE); Stefan Walz, Freiberg a. N. (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 12/873,440

(22) Filed: Sep. 1, 2010

(65) Prior Publication Data

US 2011/0099959 A1 May 5, 2011

Related U.S. Application Data

(63) Continuation-in-part of application No. 11/529,714, filed on Sep. 29, 2006, now Pat. No. 7,862,639, which is a continuation of application No. PCT/EP2005/051486, filed on Mar. 31, 2005.

(30) Foreign Application Priority Data

Mar. 31, 2004 (DE) .......................... 10 2004 016 546

(51) Int. Cl.
*B01D 46/00* (2006.01)

(52) U.S. Cl. ...... 55/385.3; 55/498; 55/502; 55/DIG. 28; 123/198 E

(58) Field of Classification Search ................. 55/385.3, 55/522–524, 529, 498, 502, 318, 491, DIG. 28; 422/172–180; 60/297; 502/303; 123/198 E
See application file for complete search history.

(56) References Cited

U.S. PATENT DOCUMENTS

2003/0010002 A1  1/2003  Johnson et al.
2004/0255783 A1  12/2004  Graham et al.

FOREIGN PATENT DOCUMENTS

WO  WO2005095783  10/2005

*Primary Examiner* — Duane Smith
*Assistant Examiner* — Minh-Chau Pham
(74) *Attorney, Agent, or Firm* — Jim Hasselbeck

(57) ABSTRACT

A filter device has a filter element made from a filter hose that has a filter wall separating an unfiltered side from a clean side of the filter device in a radial direction. In preferred embodiments the filter wall of the filter hose is provided with a very fine particle filtration layer including nanofibers. The diameter of the nanofibers is less than one micrometer. The nanofiber layer can be applied to a green filter material and the filter element can be produced subsequently from the filter material with applied nanofiber layer. Alternatively, the nanofiber layer can be applied to a finished filter element.

20 Claims, 7 Drawing Sheets

INTAKE FILTER FOR AN INTERNAL COMBUSTION ENGINE OF A MOTOR VEHICLE

CROSS REFERENCE TO RELATED APPLICATIONS

The present application is a CIP of U.S. patent application Ser. No. 11/529,714 filed Sep. 26, 2006, now U.S. Pat. No. 7,862,639 B2. U.S. patent application Ser. No. 11/529,714 is incorporated herein by reference in its entirety and to the fullest extent of the law. U.S. patent application Ser. No. 11/529,714 is a continuation of international patent application no. PCT/EP2005/051486, filed Mar. 31, 2005 designating the United States of America and published in German on Oct. 13, 2005 as WO 2005/095783, the entire disclosure of which is incorporated herein by reference. Priority is claimed based on Federal Republic of Germany patent application no. DE 10 2004 016546.7, filed Mar. 31, 2004. The present application claims priority to U.S. patent application Ser. No. 11/868,969 filed Oct. 9, 2007, now abandon. U.S. patent application Ser. No. 11/868,969 is incorporated herein by reference in its entirety and to the fullest extent of the law. U.S. patent application Ser. No. 11/868,969 claims priority based on Federal Republic of Germany patent application no. DE 10 2006 048 076.7, filed Oct. 9, 2006.

TECHNICAL FIELD

The invention relates to a filter device, in particular for filtering air in motor vehicles, for example, combustion air of internal combustion engines or air for the passenger compartment. The filter device comprises a filter element embodied as a filter hose whose filter wall separates in a radial direction the raw (unfiltered fluid) side from the clean (filtered fluid) side of the filter element.

BACKGROUND OF THE INVENTION

The invention relates to an intake filter for an internal combustion engine of a vehicle comprising a dirty air intake area, a filter medium and a clean air pipe, wherein the dirty air intake area is disposed on the underside of the engine hood of the vehicle and is connected thereto.

U.S. Pat. No. 4,932,490 discloses a vehicle with an internal combustion engine. To supply the intake air for the internal combustion engine, an unfiltered air passage is provided on the engine hood to receive the air flowing in from the front of the vehicle. This unfiltered air passage leads to a filter housing in which is disposed a filter element for filtering the dirty air. The clean, filtered air flows through a filtered air passage disposed on the engine hood side to a transfer unit from where it is guided to the internal combustion engine through a flexible hose. When the engine hood is opened, the flexible hose is separated from the clean air passage. The air filter is mounted to the engine hood and can be replaced as needed. To mount the air filter, a corresponding housing is provided, which can be opened.

One drawback of this device is that the housing of the air filter is a rigid structure. Similarly, the unfiltered air- and filtered air-carrying members are specially configured sheet metal parts that are mounted to the engine hood. They cause a stiffening of the engine hood in an area that should be relatively flexible for safety reasons. In addition, a special housing is required for the air filter element, which adds a not inconsiderable amount of weight to the engine hood.

SUMMARY OF THE INVENTION

In some embodiments, the filter device may include an unfiltered air intake area, a filter medium, and a filtered air duct, in which the unfiltered air intake area is disposed on the underside of the engine hood of the vehicle and is attached to the engine hood; and in which the filter medium comprises a tubular body having a porosity such that adequate filtering of the intake air for the internal combustion engine is ensured. In some embodiments, the filter medium is formed of a tubular body that has a porosity sufficient to ensure adequate filtering of the intake air for the internal combustion engine.

In accordance with preferred embodiments of the present invention, a filter device is disclosed that includes a filter element embodied as a filter hose whose filter wall separates in a radial direction the raw (unfiltered fluid) side from the clean (filtered fluid) side of the filter element.

In accordance with preferred embodiments of the present invention, the filter wall of the filter hose is provided with a filtration layer for very fine particles which layer is comprised of nanofibers.

The filter device according to the invention has a filter element embodied as a filter hose and the fluid to be cleaned or filtered passes radially through the filter wall of the filter hose. For improving the filtration efficiency or the degree of separation, the filter wall is provided with a very fine particle filtration layer that is comprised of nanofibers. This nanofiber layer can be configured to be very thin so that the total thickness of the filter wall including the nanofiber layer, viewed in the radial direction, is hardly greater than without the very fine particle filtration layer. For example, it can be advantageous to configure the nanofiber layer to be maximally 1/10th of the thickness of the rest of the filter wall wherein optionally also significantly smaller thicknesses of the nanofiber layer can be employed, for example, 1/100th of the filter wall thickness. As a result of the minimal thickness of the nanofiber layer and the relatively minimal density, the total weight of the filter element is practically not increased.

At the same time, the nanofiber layer enables a significant increase of the degree of separation. Advantageously, the nanofiber layer is located at the exit side of the filter wall of the filter hose so that in the flow direction an increasing degree of separation is provided. Large dirt particles will deposit on the intake side of the filter wall while the very fine dirt particles are retained by the nanofiber layer at the exit side of the filter wall.

The nanofibers are expediently manufactured of a fiber material made from polymers; they are comprised, for example, of PES (polyethersulfone), PP (polypropylene), PA (polyamide) or PC (polycarbonate or polyester). The filter material from which the filter walls of the filter hose are made is also expediently made of synthetic material, in particular made from polymers. In principle, filter materials derived from natural materials can be used also, in particular, cellulose-based materials.

According to an advantageous embodiment, it is provided that the filter wall has an increasing density from the intake side toward the exit side. This is advantageously realized with discrete filter layers, in particular, two filter layers; the layer that is facing the intake side is a coarse filtration layer and the layer that is facing the exit side is a fine filtration layer. At the exit side of the fine filtration layer, the very fine particle filtration layer or coating made of nanofibers is provided so that, as a whole, the filterwall is comprised of three layers or plies when viewed in cross-section.

The filter device with the coated filter hose can be used in different constructive embodiments. For example, it is possible to provide the filter hose with folds or pleats whose edges can extend in the longitudinal axial direction, transverse to the axial direction, and/or angularly or slantedly positioned relative to the axial direction. In particular in the last mentioned situation, such a filter hose has high stability and a large filter surface area while, at the same time, the filter hose is flexible in the axial direction as well as in the radial direction. Moreover, an accordion effect can be achieved that enables an automatic return into the initial unloaded position after a deflection of the filter hose has occurred in the axial or radial direction as soon as the external forces no longer act on the filter element.

A filter hose with smooth and fold-free walls also has a significant degree of flexibility, in particular in the transverse direction. This makes it possible to design different geometries of filter devices wherein, as a result of the flexibility, it is possible to achieve a high degree of utilization of identical parts. This means that same filter hoses can be used for different geometries, particularly filter housing geometries.

According to a preferred configuration, the coated filter hose is received in a support pipe of hard or stiff material, in particular plastic material, wherein the inner diameter of the support pipe is greater than the outer diameter of the filter hose so that between the outer wall or periphery of the filter hose and the inner wall or periphery of the support pipe an annular space for the flow of the fluid is provided. The support pipe, depending on the requirements and constructive conditions, can have different courses or extensions which, as a result of the flexibility of the filter hose, can also be realized by the filter hose.

The filter device according to the invention is suitable in particular for the filtration of combustion air for internal combustion engines, preferably for internal combustion engines of commercial vehicles. However, its utilization is not limited to such applications; instead, the filtration of gaseous and optionally also liquid fluids is possible in general.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1A:
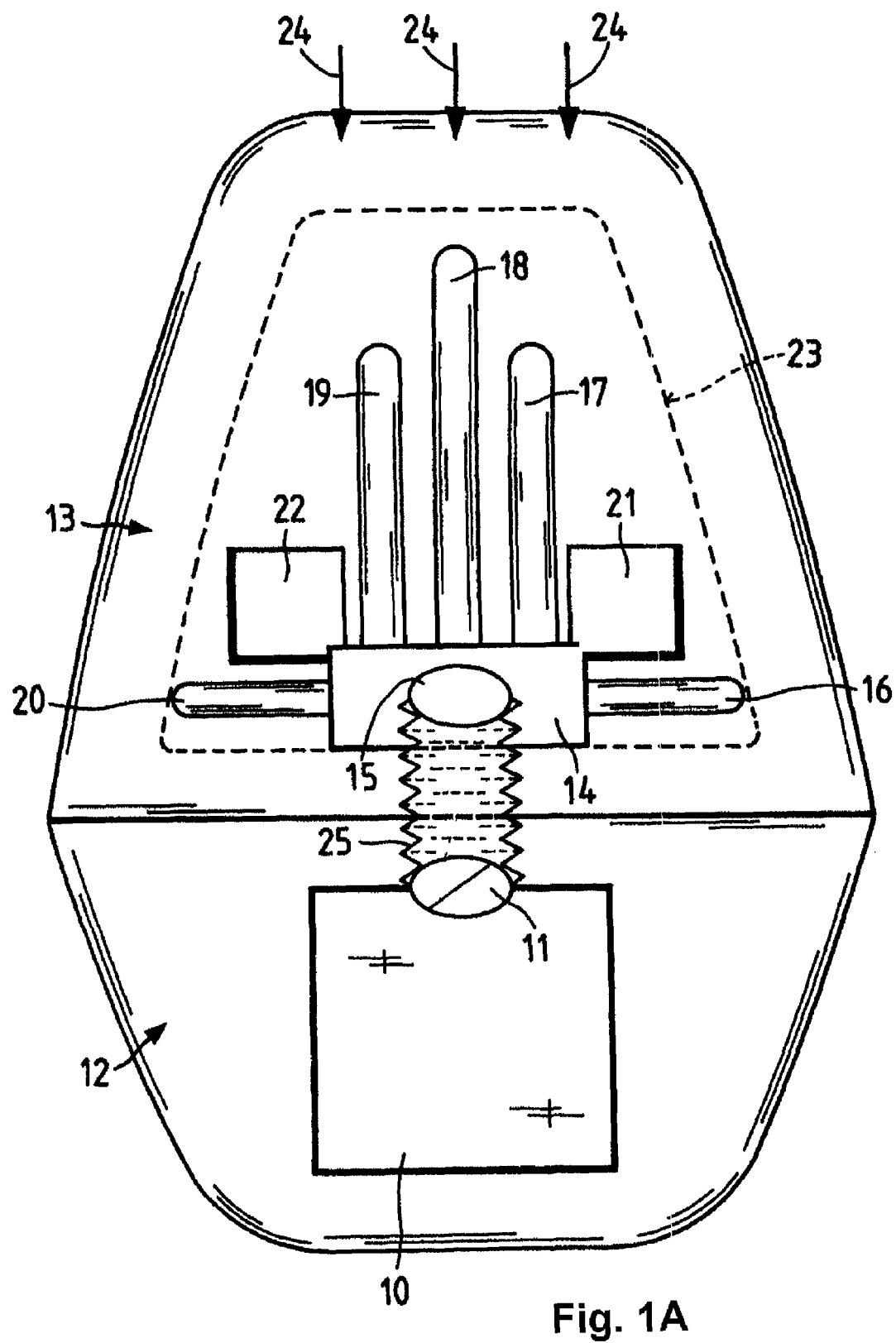
FIG. 1A is a schematic view of the engine compartment of an automobile with hood open.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter medium and filter device. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1A schematically illustrates the engine 10 of a motor vehicle. On this engine 10, there is an opening 11 through which the intake air flows in and from where it is distributed to the individual cylinders of the engine. An engine hood 13 is arranged on top of the engine compartment 12. In FIG. 1 the engine hood is shown open so that the underside of the hood is visible. On the underside of hood 13 there is a plenum chamber 14 with a filtered air opening 15. This plenum chamber in turn has openings to the outside, which communicate with tubular filter elements (tubular filters 16, 17, 18, 19, 20). These tubular filters each have a round or oval cross section and are likewise depicted only schematically. In addition to the tubular filters, resonance chambers 21 and 22 are provided, which communicate with the plenum chamber 14 through openings and which are appropriately configured to dampen the intake air noise. The tubular filters and the resonance chambers are covered relative to the engine by a substantially airtight cover 23. In the drawing the cover is merely indicated by a broken line. This cover is open toward the front of the vehicle and toward the front of the engine hood, so that fresh air can flow into the filter area from the front, i.e., from the front of the vehicle, as indicated by arrows 24. This fresh air is cleaned by the tubular filters and made available to the internal combustion engine.

A connection between the clean air opening 15 and the opening 11 for the intake air on the engine 10 is established by closing the engine hood. If desired, both openings may be permanently connected by a flexible connecting hose 25. It is also possible to use suitable interengaging connecting members to produce the elastic connection, which is released when the engine hood is opened, but this requires that the opening 11 be closed when the engine hood is open. Closure of opening 11 can be accomplished, for example, by a suitable diaphragm or flap over the opening.

Figure 1B:
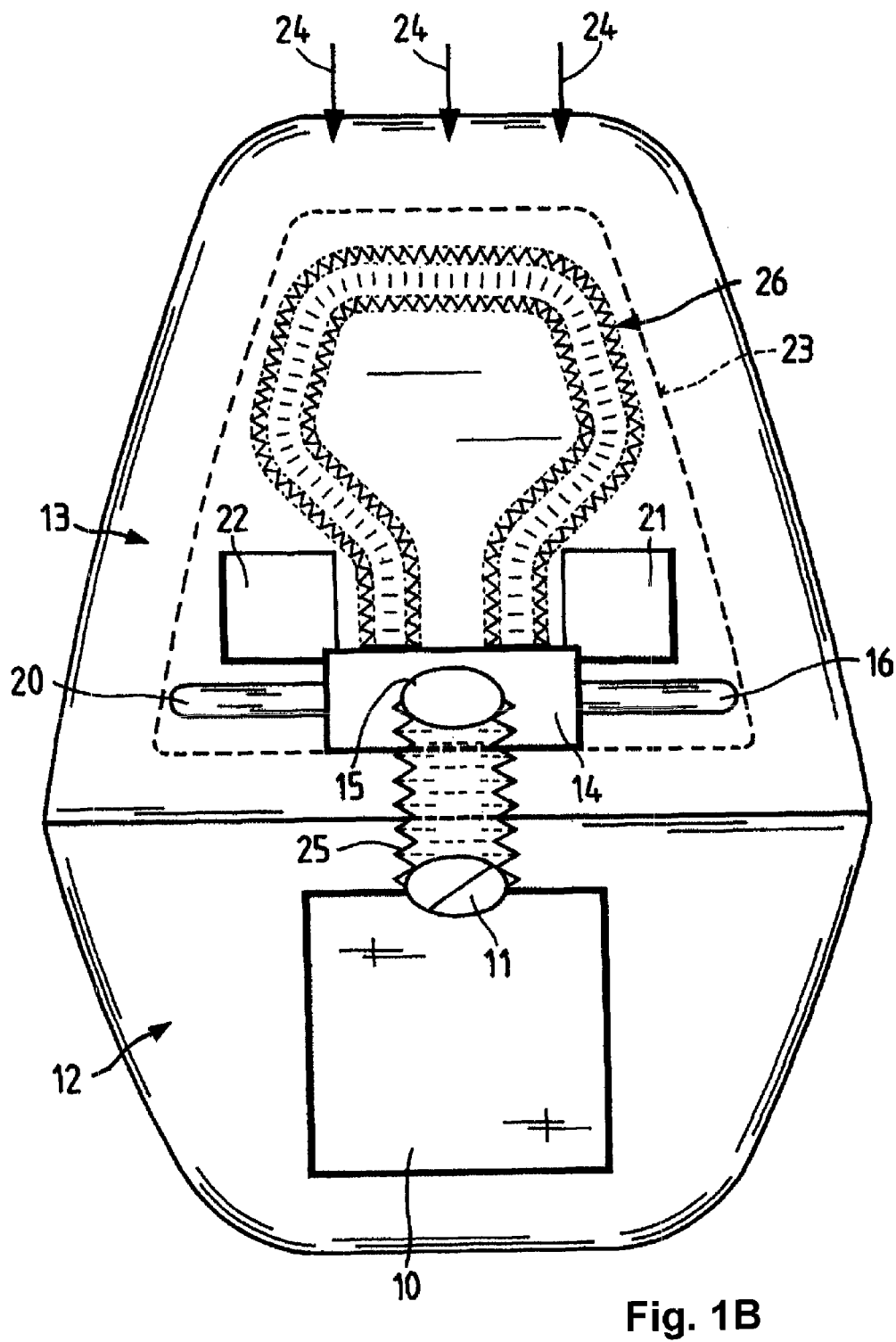
FIG. 1B shows the construction depicted in FIG. 1A with a modified filter variant.

FIG. 1B shows an alternate embodiment using a flexible tubular filter 26 connected to the intake plenum 14 in place of the static tubular filters. In this figure, components corresponding to those depicted in FIG. 1A are identified by the same reference numerals. The tubular filter 26 is formed of a nonwoven web or paper material with filtering properties. The filter medium itself has a plurality of parallel pleats arranged side by side and extending perpendicularly to the longitudinal axis of the filter. This makes possible a flexible installation of the filter medium adaptable to the structure of the engine hood. Of course, many different types of installation are feasible here. For high volume engines, in particular, it is possible to provide a correspondingly large active filtering surface.

Figure 1C:
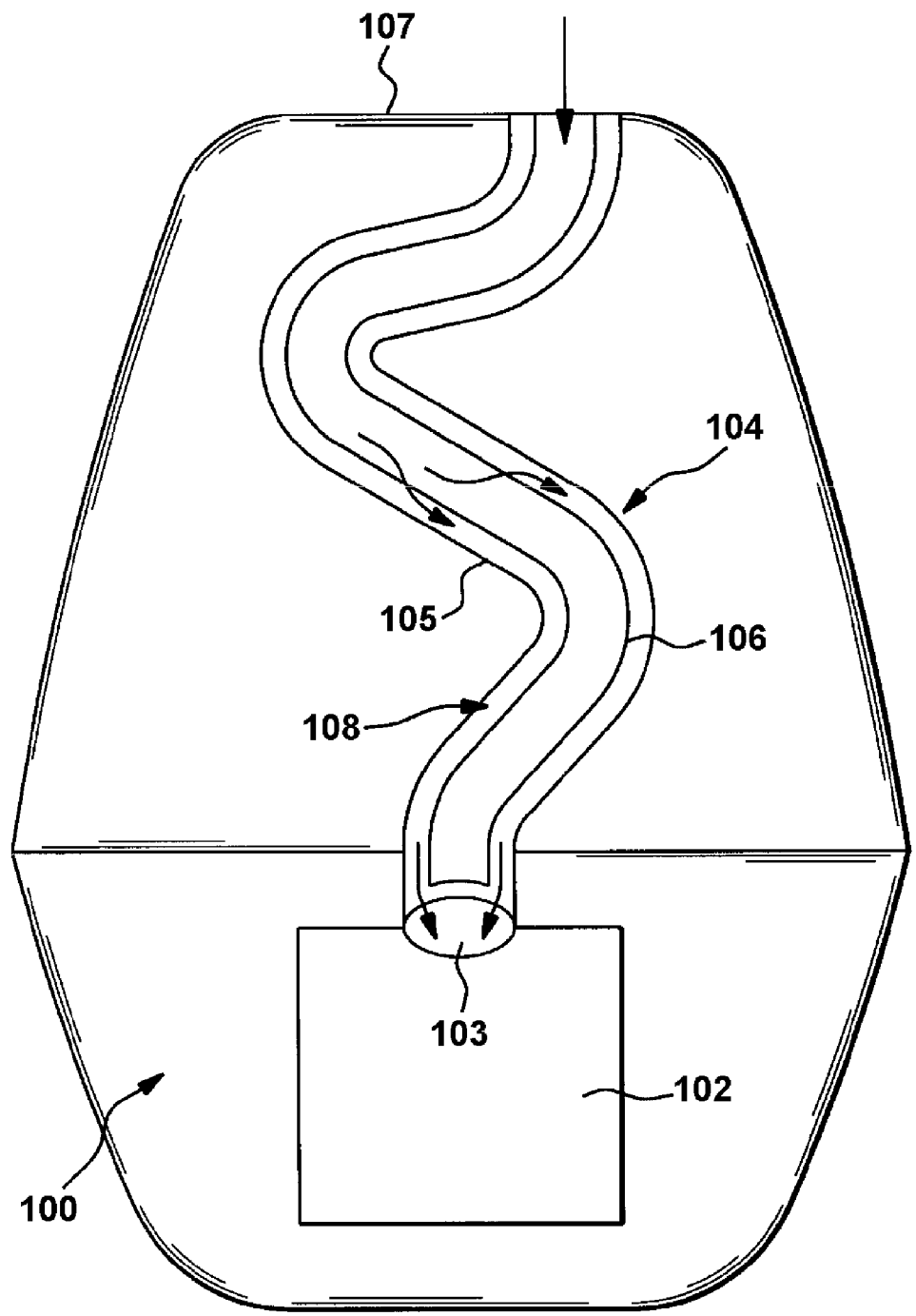
FIG. 1C is a schematic illustration of the engine compartment of a motor vehicle with a filter device arranged therein for filtration of the combustion air, wherein the filter device is configured as a support pipe with a filter hose arranged therein.
Figure 8:
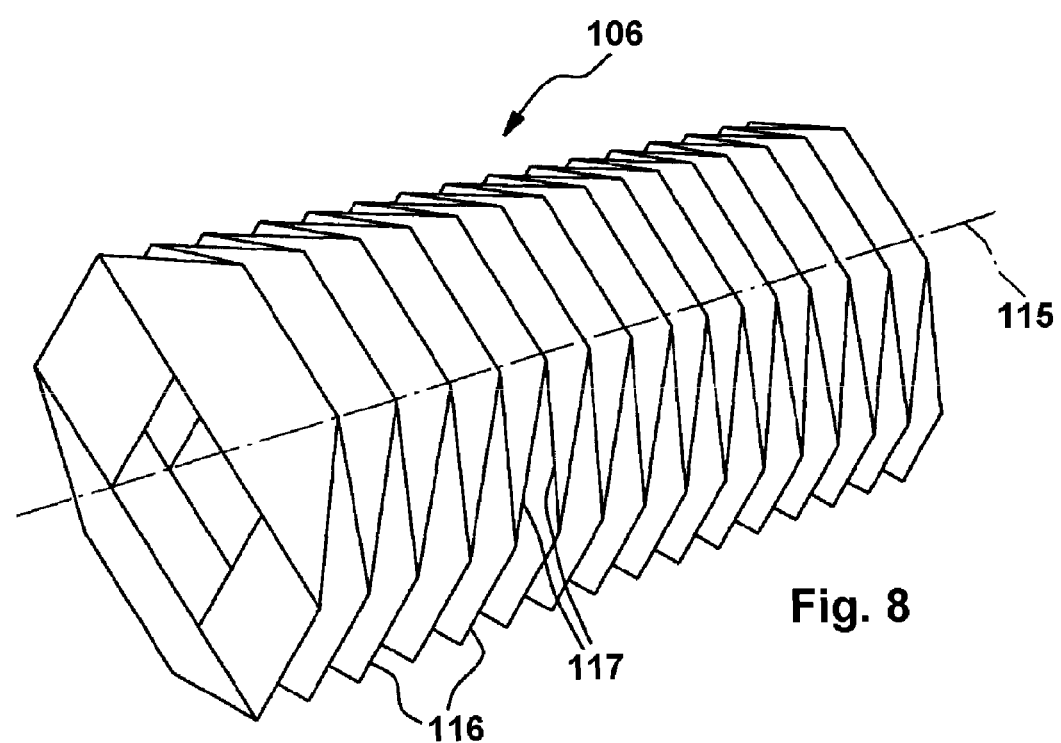
FIG. 8 is a perspective illustration of a filter hose having a wall provided with folds or pleats.

FIG. 1C illustrates the engine compartment 100 of a motor vehicle with internal combustion engine 102 arranged therein. The cylinder intakes of the internal combustion engine 102 are supplied with filtered combustion air through an opening 103; the combustion air is filtered in the filter device 104 arranged upstream of the opening 103. The filter device 104 is comprised of a cover configured as support pipe 105 that takes on the function of the filter housing and a flexible tubular filter element in the form of a filter hose 106 arranged in the support pipe 105 and extending across the axial length of the support pipe 105. As shown in FIGS. 1A, 1B and 1C, the tubular filter(s) (17-19, 26 and 106) is/are enclosed or covered relative to the engine (10,102) by an airtight cover (23, 105) that is open towards the front to the vehicle (24, 107) and toward the front of the engine hood, so fresh air can flow in. Although the filter element 106 is generally tubular, it need not have a circular cross section. For example, as shown in FIG. 8, the filter element 106 may have an octagonal cross section or other cross sectional shape without deviating from the teachings of the present invention. The flexible filter hose 106 in the support pipe 105 has a smaller cross-sectional surface area than the support pipe 105 so that between the outer wall of the filter hose 106 and the inner wall of the support pipe 105 an annular space 108 is provided that extends between the opposite axial end faces of the support pipe 105 and the filter hose 106 and provides a flow chamber for the combustion air. The support pipe 105 with the filter hose 106 extends between the front end 107 of the motor vehicle and the opening 103 that is correlated with the intake passages of the internal combustion engine 102. The combustion air that flows in at the front end 107 of the motor vehicle is introduced axially into the interior of the filter hose 106; the end face opposite the inlet is closed off. The unfiltered combustion air is therefore forced to pass through the filter walls of the filter hose 106 in the radial direction from the interior to the exterior so that dirt particles entrained in the combustion air are separated or filtered out. The clean air flows axially through the annular space 108 or flow chamber provided between the filter hose 106 and the support pipe 105 to the opening 103.

In principle, it is also possible that the flow direction through the filter wall of the filter hose 106 is realized in the opposite direction, i.e., radially from the exterior to the interior. In this case, the annular space 108 is the raw (unfiltered air) side and the interior of the filter hose is the clean (filtered air) side.

Figure 2:
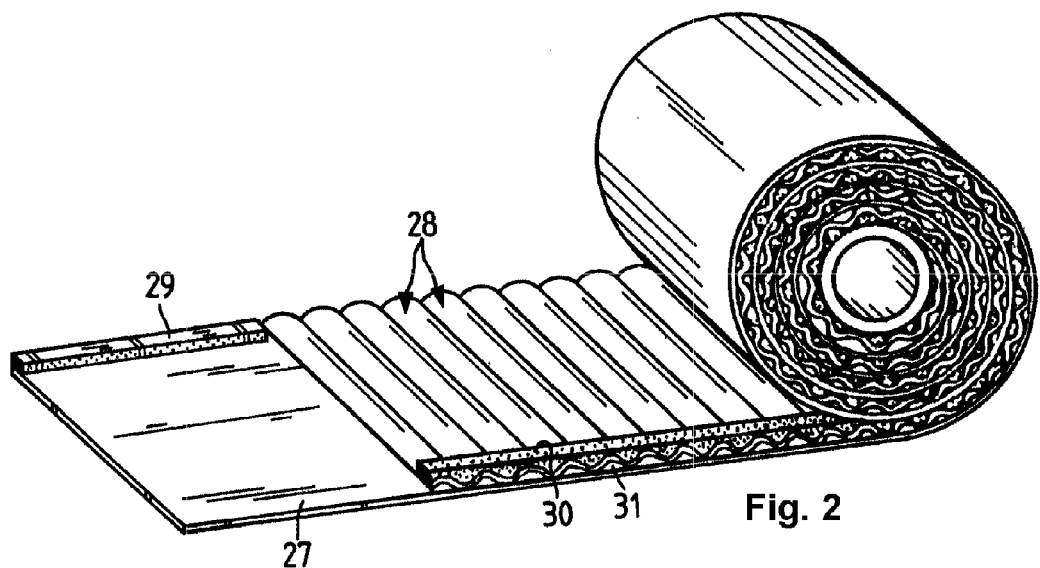
FIG. 2 is a perspective view of a wound filter element for installation in an engine hood.

FIG. 2 shows one embodiment of the filter medium as a wound filter element. This wound filter consists of a first, flat filter web 27 onto which is placed a second, corrugated web 28. Corrugated web 28 is glued to the flat web 27 by a bead of adhesive 29 on one side of the filter element. During winding, a bead of adhesive 30 is applied to the opposite side to join the corrugated web 28 to the previously wound flat web 27. This creates channels 31 which are open at one end so that air can enter. The air cannot escape on the opposite end, however, because the opposite end is closed by the adhesive. Instead, the air must pass through the corrugated filtering web, whereby it is filtered, into an adjacent channel which is open at the opposite end so that the now filtered air can exit from the opposite side. A wound filter of this type can, of course, also have an oval shape. Alternatively, the flat and corrugated layers can be stacked to form a cube as shown in FIG. 3.

Figure 3:
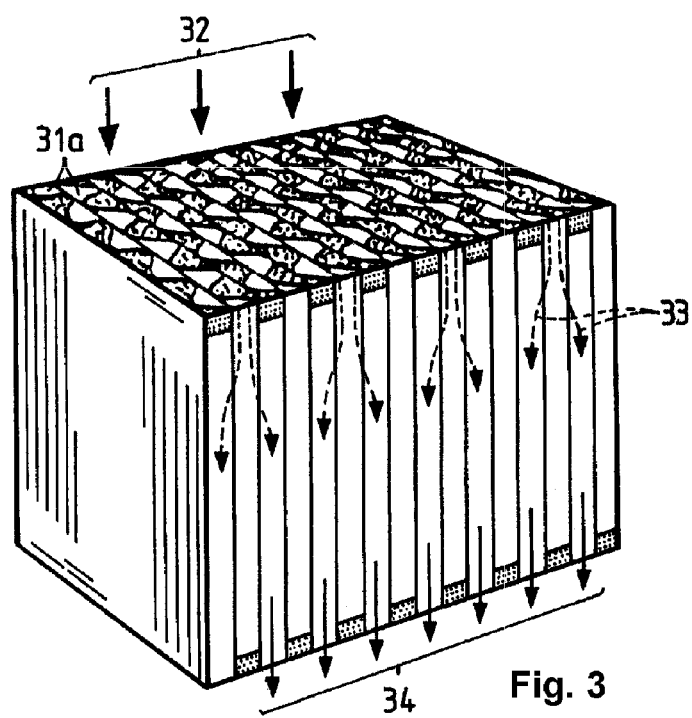
FIG. 3 is perspective view of a variant of a wound filter element for optimal adaptation to the structure of an engine hood.

FIG. 3 also illustrates the alternately closed openings of the individual channels. The unfiltered air enters the channels in the direction indicated by arrows 32, flows through walls of filter material separating adjacent channels as indicated by arrows 33, and leaves the filter element clean as indicated by arrows 34.

Figure 4:
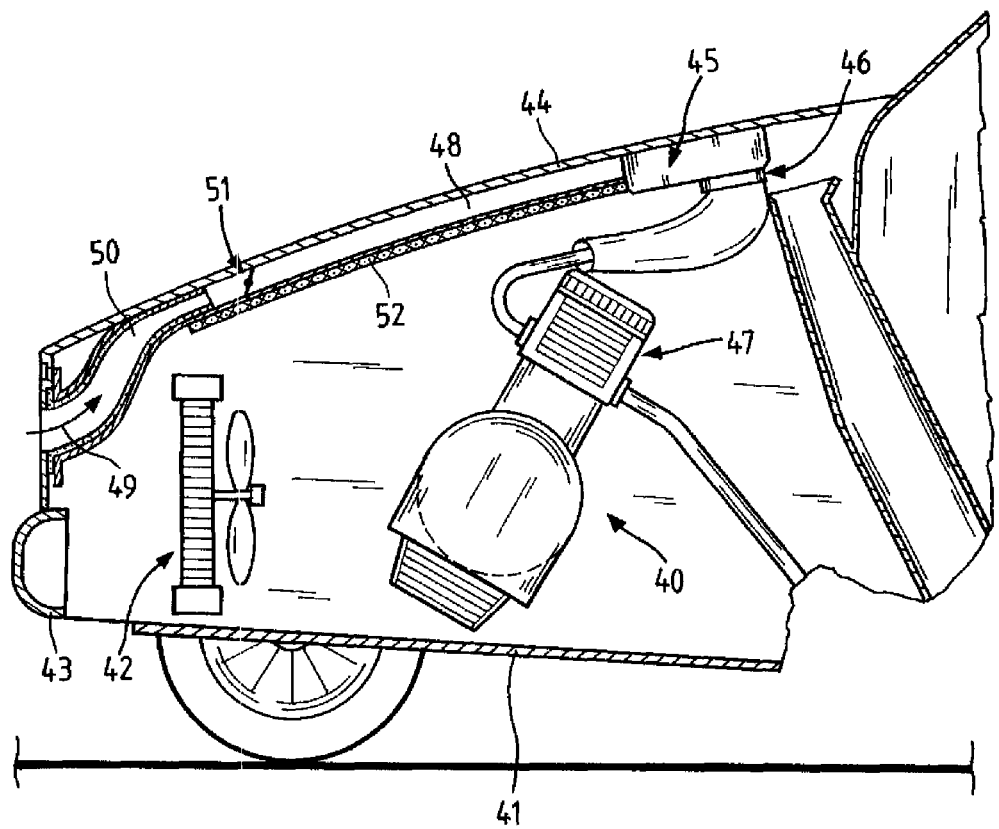
FIG. 4 is a schematic representation of an engine compartment of a motor vehicle.

FIG. 4 is a schematic view of the front end of a vehicle, including the internal combustion engine 40, which is mounted above a floor panel 41. A cooling system 42 is provided in front of the internal combustion engine. A bumper 43 is located in front of the cooling system 42. The engine compartment is closed by the engine hood 44. A plenum chamber 45 is mounted to the underside of the engine hood. An intake manifold 47 extends from this plenum chamber 45 through a connecting flange 46 to the internal combustion engine 40. At least one intake air duct 48 is associated with the plenum chamber 45. Each intake air passage 48 is likewise disposed directly on the underside of the engine hood 44 and extends to the air inlet 49. Air inlet 49 is disposed in the area of the front end of the internal combustion engine. A tubular filter 50 is disposed inside intake air passage 48 and extends from the air inlet 49 over a specific length of the intake air passage.

To reduce intake noise at the air inlet 49, a flap valve 51 may be provided in the intake air passage 48. This reduces the cross-section of the passage depending on the required air volume and thereby prevents sound radiation of the intake noise of the internal combustion engine. It is also possible to dispose this flap valve directly at the air inlet 49, optionally in front of the tubular filter 50. Below the intake air passage 48, a sound absorbing insulating mat 52 is provided, which simultaneously acts as the lining for a plurality of intake air passages. If the engine hood 44 can be opened, the intake manifold 47 is a pipe that is flexible over its length. This flexibility is obtained, for example, by pleating or by a telescopic construction. If the engine hood can be removed only for maintenance purposes, the intake manifold 47 can be made rigid. In this case, the intake manifold 47 must be detached at the connecting flange 46. In these cases, the connection between intake manifold 47 and connecting flange 46 can be a plug-in connection.

Figure 5:
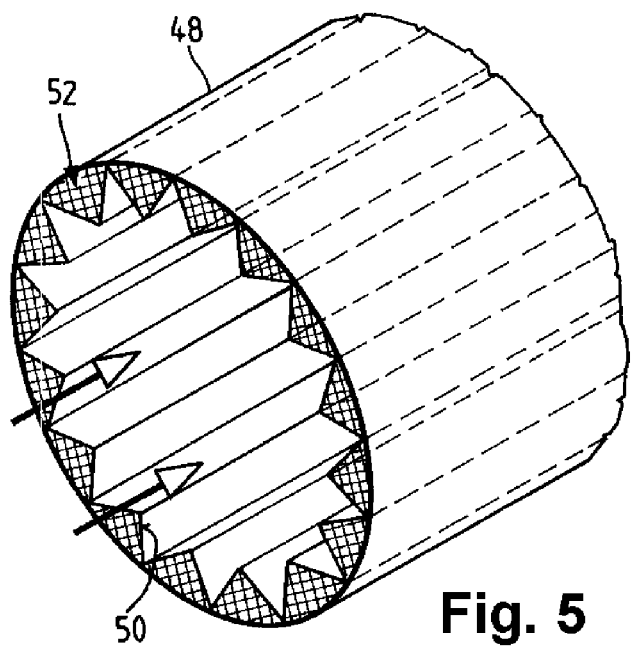
FIG. 5 is perspective representation of a pleated filter element.

FIG. 5 is a detail view of one embodiment of a tubular filter 50 which is pleated in longitudinal direction and disposed in a closed intake air passage 48. Unfiltered air flows into the interior of the tubular filter 50. This of course requires the hatched area 52 to be sealed, which is accomplished by a correspondingly configured flange. The air to be cleaned flows outwardly within the intake air passage 48 into the clean air area and then flows through the intake air passage to the plenum chamber 45.

Figure 6:
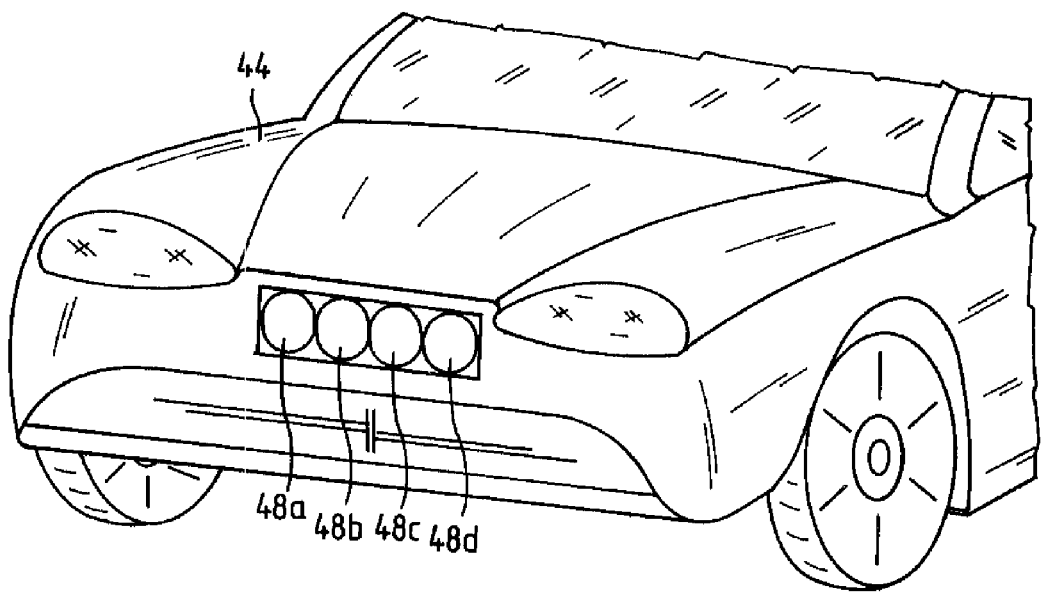
FIG. 6 is a front elevational detail view of the device illustrated in FIG. 4.

FIG. 6 is a front elevational detail view of a vehicle with the individual intake air passages 48a-d disposed in the area of the air inlet. It may be seen here that four individual intake air passages run to the plenum chamber. The advantage of individual intake air passages is that they can take different paths and can also detour around structures of the engine hood if necessary. At the entry of the intake air passages into the plenum chamber, the cross section abruptly changes. This abrupt change in cross section is necessary to improve the intake acoustics, i.e., to reflect sound waves. If the intake air passages are disposed on the underside of the engine hood it is advantageous to seal the openings relative to the engine compartment so that no hot air is drawn in, but fresh air from the area of the front end can be supplied in any case.

Figure 7:
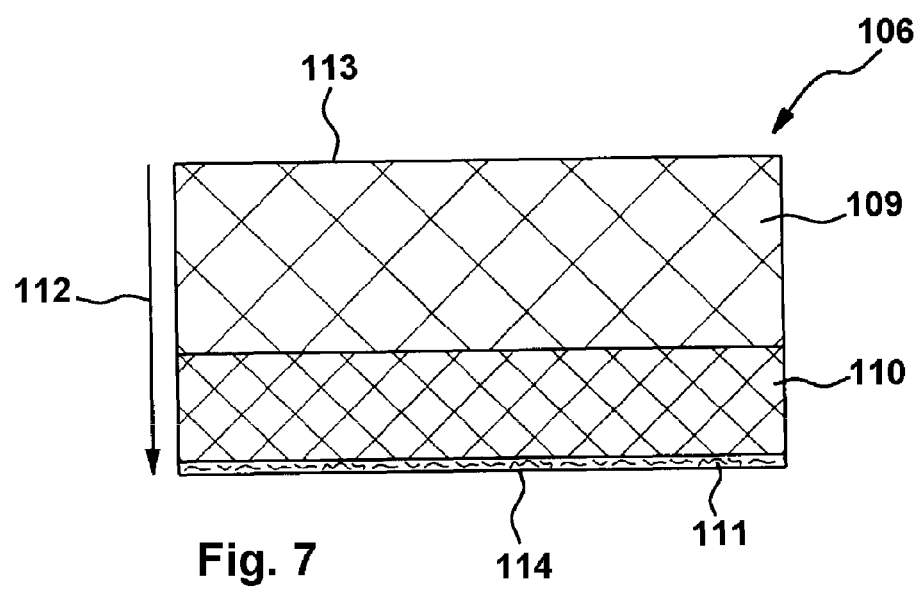
FIG. 7 is a section view of the wall of the filter hose comprising at the intake side a coarse filtration layer and at the exit side a fine filtration layer wherein in addition at the exit side a coating or layer of nanofibers is provided on the fine filtration layer.

In FIG. 7, the wall of the filter element, for example filter hose 106 depicted in FIG. 1C, is shown in section in FIG. 7. The arrow 112 indicates the flow direction; the intake side is identified at 113 and the exit side at 114. The filter wall of the filter element is of a multi-layer configuration and comprises a coarse filtration layer 109 at the intake side 113 and a fine filtration layer 110 at the exit side 114. This fine filtration layer 110 is provided at the exit side with a very fine particle filtration layer 111 comprised of nanofibers. Accordingly, the filter wall in the flow direction 112 of the fluid to be filtered is of a multi-layer configuration wherein the density or the degree of separation increases from layer to layer. The thickness of the very fine particle filtration layer 111 in comparison to the thickness of the two other layers 109 and 110 is minimal. For example, the thickness of the very fine particle filtration layer 111 is maximally ⅒th, optionally only ¹⁄₁₀₀th of the thickness of the two layers 109 and 110 together. The diameter of the nanofibers is advantageously less than one micrometer and is in particular in a range from between 50 nm to 500 nm.

In FIG. 8, a filter hose 106 is shown in a perspective view. Its filter wall is configured in the way illustrated in FIG. 7. The filter hose 106 has a plurality of pleats 116 that are distributed about the circumference in the axial direction as well as in the circumferential direction. Some of the pleats 116 have filter edges 117 that, relative to the longitudinal axis 115 of the filter element or to a longitudinal center plane of the filter element, are positioned at an angle, i.e., they extend slantedly relative to the longitudinal axis. In this way, the filter hose has a bellows-like structure imparting high stability and, at the same time, high flexibility in the longitudinal direction as well as in the radial direction.

The filter device 104 according to the present invention is suitable in particular for the filtration of combustion air for internal combustion engines. However, a utilization for air filtration of the passenger compartment or, generally, for filtration purposes in vehicles is possible.

The filter device 104 can be manufactured in that a nanofiber layer is applied onto a green filter material (not yet processed to a finished filter element) and, subsequently, the green filter material with the applied nanofiber layer is processed to produce a finished filter element.

It is also possible that the nanofiber layer is applied onto a finished filter element, i.e., the filter element is first produced to the desired specifications and the nanofiber layer is applied to the finished filter element.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A filter device for an internal combustion engine of a motor vehicle, said filter device comprising:
   an unfiltered air intake area,
   a flexible elongated filter element comprised of a filter hose of a filter medium, said filter hose having a filter wall separating an unfiltered side from a clean side of the filter device in a radial direction,
   wherein the filter wall of the filter hose is provided with a very fine particle filtration layer comprised of nanofibers,
   wherein said filter element is flexible in at least one of an axial and a radial direction,
   a filtered air duct,
   wherein the unfiltered air intake area is disposed on the underside of the engine hood of the vehicle and is attached to the engine hood,
   wherein the filter hose comprises a tubular body mounted to and moving with the engine hood, the filter medium having a porosity such that adequate filtering of the intake air for the internal combustion engine is ensured,
   wherein the tubular body has a pleated geometry that facilitates a curved installation,
   wherein the tubular body is arranged on an underside of the engine hood within a substantially airtight cover, said a cover having an intake air passage open toward the front of the vehicle and toward the front of the engine hood to draw in air into said unfiltered side of said filter hose,
   wherein at least one intake air passage is provided in which said filter hose is arranged, said intake air passage extending directly under the engine hood inside side cover and opening into a common plenum chamber delivering air to said engine, and
   wherein between an outer wall of said filter hose and an inner wall of the said cover an annular space is provided for a flow of a fluid to be filtered.

2. The filter device according to claim 1, wherein a diameter of the nanofibers is less than one micrometer.

3. The filter device according to claim 1, wherein a diameter of the nanofibers is in a range of between 50 nm to 500 nm.

4. The filter device according to claim 1, wherein the nanofibers are comprised of a fiber material made from a polymer.

5. The filter device according to claim 4, wherein the polymer is selected from the group consisting of PES (polyethersulfone), PP (polypropylene), PA (polyamide), and PC (polycarbonate).

6. The filter device according to claim 1, wherein the very fine particle filtration layer is arranged at an exit side of the filter wall in a flow direction of a fluid to be filtered.

7. The filter device according to claim 1, wherein a thickness of the very fine particle filtration layer is small in comparison to a radial thickness of the filter wall.

8. The filter device according to claim 1, wherein the filter wall has increasing density in a direction from an intake side to an exit side of the filter wall in a flow direction of a fluid to be filtered.

9. The filter device according to claim 8, wherein
the filter wall in the radial direction has at least two discrete filter layers,
wherein a first one of the at least two filter layers is a coarse filtration layer and faces the intake side and
wherein a second one of the at least two filter layers is a fine filtration layer and faces the exit side.

10. The filter device according to claim 1, wherein the filter hose is comprised of synthetic filter material.

11. The filter device according to claim 10, wherein the synthetic filter material is a polymer material.

12. The filter device according to claim 1, further comprising
a support pipe,
wherein the filter hose is received in the support pipe.

13. The filter device according to claim 1 in the form of an air filter for an internal combustion engine of a commercial vehicle.

14. A method for producing a filter device according to claim 1, comprising the steps of:
applying a nanofiber layer onto a green filter material;
subsequently, processing the green filter material with the applied nanofiber layer to a filter element; and
forming said green filter material into said elongated, flexible filter element, said forming such that said filter element is flexible in at least one of an axial and a radial direction;
wherein said forming step includes forming a plurality of pleats in said green filter material with said peats distributed in an axial direction of said elongated filter element as well as in a circumferential direction of said elongated filter element such that said filter element is flexible in both said radial and axial directions.

15. A method for producing a filter device according to claim 1, comprising the steps of
forming a green filter material into said elongated, flexible filter element, said forming such that said filter element is flexible in at least one of an axial and a radial direction,
wherein said forming step includes forming a plurality of pleats in said green filter material with said peats distributed in an axial direction of said elongated filter element as well as in a circumferential direction of said elongated filter element such that said filter element is flexible in both said radial and axial directions;
applying a nanofiber layer onto said filter element.

16. The method of claim 14,
wherein said forming step includes forming a plurality of pleats such that fold direction of pleat tips in axially adjacent pleats are arranged at substantially 90 degrees to each other.

17. The filter device according to claim 9 further comprising:
a plurality of pleats form in a wall of said filter hose, said peats distributed in an axial direction of said elongated filter element as well as in a circumferential direction of said elongated filter element such that said filter element is flexible in both said radial and axial directions.

18. A filter device for an internal combustion engine of a motor vehicle, said filter device comprising:
an unfiltered air intake area,
a flexible elongated filter element comprised of a filter hose of a filter medium, said filter hose having a filter wall separating an unfiltered side from a clean side of the filter device in a radial direction,
wherein the filter wall of the filter hose is provided with a very fine particle filtration layer comprised of nanofibers,
wherein said filter element is flexible in at least one of an axial and a radial direction,
a filtered air duct,
wherein the unfiltered air intake area is disposed on the underside of the engine hood of the vehicle and is attached to the engine hood,
wherein the filter hose comprises a tubular body mounted to and moving with the engine hood, the filter medium having a porosity such that adequate filtering of the intake air for the internal combustion engine is ensured,
wherein the tubular body has a pleated geometry that facilitates a curved installation,
wherein the tubular body is arranged on an underside of the engine hood within a substantially airtight cover, said a cover having an intake air passage open toward the front of the vehicle and toward the front of the engine hood to draw in air, and
wherein at least one intake air passage is provided in which the filter medium is arranged, said intake air passage extending directly under the engine hood between said engine hood and said air-tight cover and opening into a common plenum chamber,
wherein said cover is a tubular support pipe in which said filter element is arranged,
wherein between an outer wall of the filter hose and an inner wall of the support pipe an annular space is provided for a flow of a fluid to be filtered.

19. The filter device according to claim 18, wherein
at least two of said intake air passages are provided in which the filter medium is arranged, each of said intake air passages extending directly under the engine hood between said engine hood and said elastic air-tight cover and opening into a common plenum chamber.

20. The filter device according to claim 18, wherein
a diameter of the nanofibers is in a range of between 50 nm to 500 nm,
wherein the nanofibers are comprised of a fiber material made from a polymer selected from the group consisting of PES (polyethersulfone), PP (polypropylene), PA (polyamide), and PC (polycarbonate),
wherein the very fine particle filtration layer is arranged at an exit side of the filter wall in a flow direction of a fluid to be filtered,
wherein the filter wall has increasing density in a direction from an intake side to an exit side of the filter wall in a flow direction of a fluid to be filtered,
wherein the filter wall in the radial direction has at least two discrete filter layers,
wherein a first one of the at least two filter layers is a coarse filtration layer and faces the intake side, wherein a second one of the at least two filter layers is a fine filtration layer and faces the exit side, wherein said wall of said filter element includes a plurality of pleats, said peats distributed in an axial direction of said elongated filter element as well as in a circumferential direction of said elongated filter element such that said filter element is flexible in both said radial and axial directions.

* * * * *